Dec. 15, 1936.  C. E. STARR  2,064,230
FREEWHEELING MECHANISM
Filed March 14, 1935
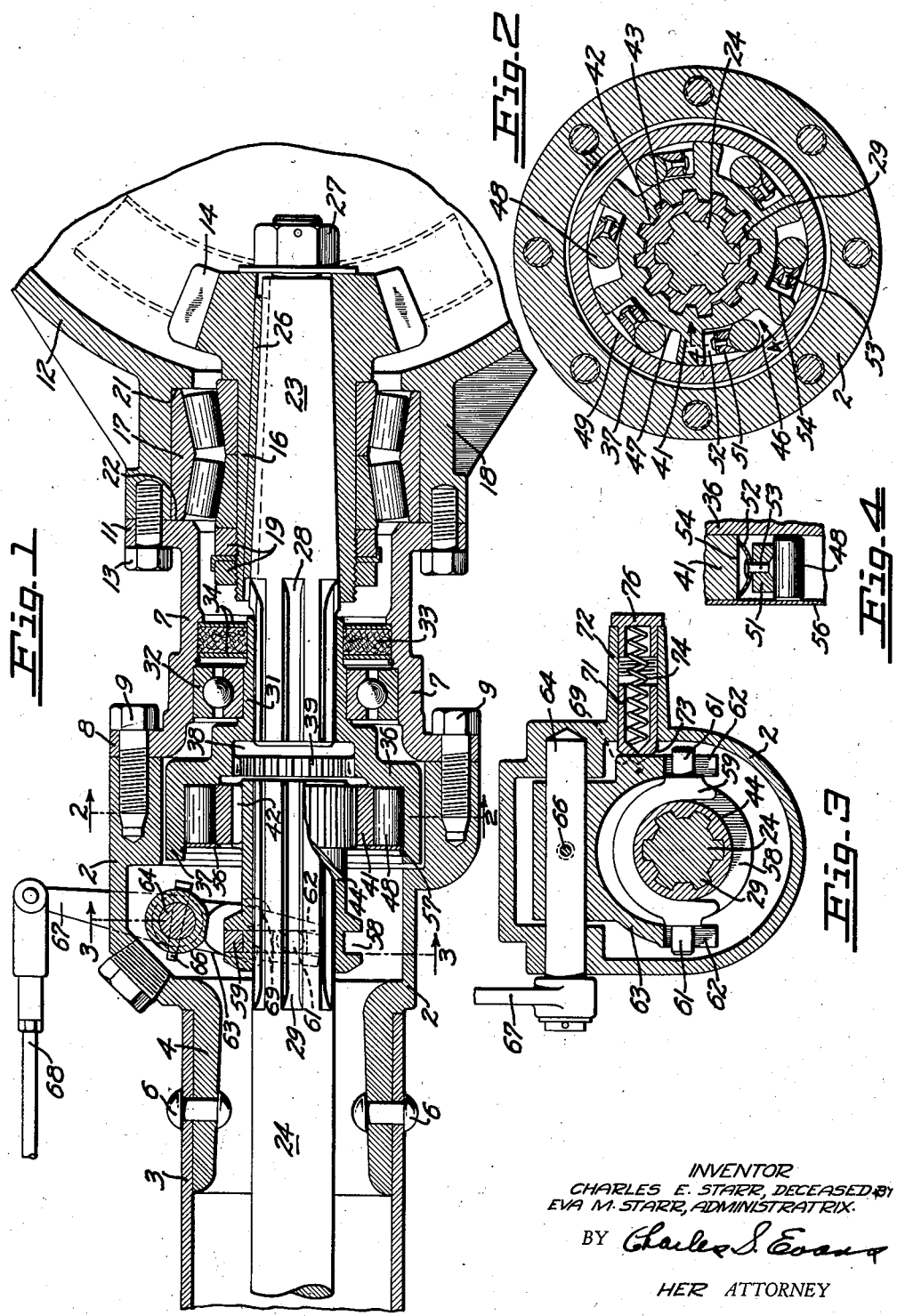
INVENTOR
CHARLES E. STARR, DECEASED BY
EVA M. STARR, ADMINISTRATRIX.
BY Charles S. Evans
HER ATTORNEY Patented Dec. 15, 1936

2,064,230

UNITED STATES PATENT OFFICE 2,064,230

FREEWHEELING MECHANISM

Charles E. Starr, deceased, late of Inglewood, Calif., by Eva M. Starr, of Inglewood, Calif., administratrix, assignor to Perfecto Gear Differential Co., Bellingham, Wash., a corporation of Washington Application March 14, 1935, Serial No. 11,034

1 Claim. (Cl. 192—48)

The invention relates to a free wheeling mechanism, and particularly to a mechanism which may be inserted in the propeller shaft of a vehicle.

Another object of the invention is the provision of means whereby the operator may optionally include an overrunning clutch in the propulsion system of the vehicle, or may exclude it from operation therewith.

Another object of the invention is to provide a free wheeling mechanism of the character described in which simplified means are provided for including or excluding the overrunning clutch from the propulsion system.

A further object of the invention is the provision of a free wheeling mechanism which may be readily installed in vehicles not originally equipped with such a device.

The invention possesses other objects and features of advantage, some of which, with the foregoing, will be set forth in the following description of the invention. It is to be understood that the invention is not limited to this disclosure of species of the invention, as variant embodiments thereof may be adopted within the scope of the claims.

Referring to the drawing:

Figure 1 is a vertical sectional view showing the free wheeling mechanism installed in the propeller shaft of a vehicle.

Figure 2 is a sectional view through the overrunning clutch. The plane in which the section is taken is indicated by the line 2—2 of Figure 1.

Figure 3 is a sectional view showing the sleeve shifting mechanism. The plane of section is indicated by the line 3—3 of Figure 1.

Figure 4 is a fragmental view in section of one of the clutch rollers and the mounting therefor. The plane of section is indicated by the line 4—4 of Figure 2.

Broadly stated, the free wheeling mechanism embodying the invention comprises a fixed housing preferably forming a part of the torque tube of an automobile. A pair of shafts and an overrunning clutch are arranged in the housing, and means are provided for optionally locking the shafts together for rotation as one or connecting the shafts through the overrunning clutch.

In greater detail, the preferred form of free wheeling mechanism embodying the invention comprises a housing having a main body portion 2 adapted to be connected in and form a part of the torque tube 3 of a vehicle. This connection is preferably effected by an extension 4 inserted in the end of the torque tube and secured by the rivets 6. A tubular portion 7 having a flange 8 is provided at the opposite end of the housing and is secured to the enlarged body portion 2 by suitable means, as by the screws 9 passing through the flange 8. The outer end of the housing portion 7 is provided with a flange 11 adapted to be secured to a rear axle housing 12 by suitable screws 13.

The pinion 14, which meshes with the master gear of the rear axle, is provided with an extension 16 journaled in a bearing 17. A tubular extension 18 of the axle housing serves to support the bearing 17, and suitable means, such as the locknuts 19 and shoulders 21 and 22, serve to secure the pinion and its bearing in position. A driven shaft 23, axially aligned with the driving shaft 24, is secured in the pinion by a key 26. Nut 27 serves to prevent axial movement of the shaft in the pinion. Splines 28 and 29 are formed on the opposing ends of the shafts 23 and 24 to provide driving connection with other parts of the mechanism.

A bell-shaped rotor is provided on the inner end of the driven shaft 23 and has a hub portion 31 splined on the latter shaft and journaled in the housing in a suitable bearing 32. Packing washer 33, disposed between the housing and hub and held by the washers 34, is preferably provided for confining the lubricant. The flared portion 36 of the rotor terminates in an annular flange portion 37 which is disposed in axial alignment with the shafts. This flange provides the outer bearing ring for the overrunning clutch.

The shape of the rotor portion 36 is such as to provide a recess 38 in which internal clutch teeth 39 are disposed. Journaled in the ring 37 is the cam ring 41 of the overrunning clutch. Internal clutch teeth 42 are formed on the cam ring and mesh with complementary teeth 43 formed at one end of a sleeve 44 slidably splined on the driving shaft 24. Teeth 43 on the sleeve are also adapted to mesh with the clutch teeth 39 on the rotor.

The overrunning clutch construction is best shown in Figure 2. As here shown, notches 46 are provided in the periphery of the cam ring 41. The bottom 47 of each of the notches is disposed angularly with the periphery of the cam ring to make the notch deeper at one end than at the other. A roller 48 is disposed in each notch, so as to contact the bottom thereof and the inner surface 49 of the bearing ring;

and a thrust block 51 is provided, on the concave face of which the roller 48 is adapted to seat. A leaf spring 52, secured to the block by a rivet 53 and bearing against the side 54 of the notch, serves to wedge the roller between the surfaces 47 and 49. A plate 56, secured in the flange 37 by means of the snap ring 57, provides for the retention of the rollers and thrust blocks in the ring notches.

Means are provided for shifting the sleeve 44 to lock the drive and driven shafts together for rotation as one, thereby rendering the overrunning clutch inoperative. For this purpose a groove 58 is provided in the sleeve, in which the half collar 59 is journaled. Formed on the collar are studs 61 engaged by the forked ends 62 of a shifting yoke 63. A shaft 64, to which the yoke is connected by suitable means, such as the pin 66, has at one end thereof a lever 67. Rod 68 is provided to connect the lever 67 with a suitable shifting lever located adjacent the driver's seat.

Means are preferably provided for latching the sleeve in a selected position. Formed on one arm of the yoke 63 are a pair of indentations 69 corresponding to the two operating positions of the sleeve. A plunger 71 is provided slidable in a tubular projection 72 of the housing and having a pointed end 73 which is adapted to seat in one or the other of the indentations. A spring 74, compressed between the plunger and a retaining plug 76 threaded into the projection 72, urges the pointed end of the plunger into engagement with the indentations.

In the position of the sleeve as shown in Figure 1 the overruning clutch is included in the propulsion system of the vehicle. While free wheeling is desirable under certain operating conditions, it is undesirable under others. By manipulation of a shifting lever conveniently at hand adjacent the driver's seat the sleeve 44 may be shifted so that the teeth 43 thereon engage the clutch teeth 39 fixed for rotation with the driven shaft 23. As a result the drive and driven shafts are locked together for unitary rotation, and the overrunning clutch is rendered inoperative.

What is claimed is:

A free wheeling mechanism comprising a housing adapted to be interposed in the torque tube of an automobile, said housing comprising an enlarged forward portion and a rear bearing portion, means connecting the housing portions together, a driven shaft journaled in the rear portion of the housing, a shiftable driving element in the forward portion of the housing and axially aligned with the driven shaft, a bell shaped rotor fixed for rotation with the inner end of the driven shaft and projecting into the enlarged forward portion of the housing, said rotor enclosing the inner end of the driving element and having an annular portion providing a bearing ring, a cam ring encircling the shiftable element and journaled in the bearing ring, clutch teeth on the cam ring, clutch teeth on the shiftable element slidably engageable with the teeth on the cam ring, said rotor having an open recess between the cam ring and the point where the rotor is fixed to the driven shaft and into which the driving element may be shifted, clutch teeth in said recess of the rotor with which the teeth on the shiftable element may be engaged, and means for shifting said element.

EVA M. STARR,
*Administratrix of the Estate of Charles E. Starr, Deceased.*